United States Patent
Tiwari

(10) Patent No.: US 9,313,636 B2
(45) Date of Patent: Apr. 12, 2016

(54) METHOD OF HANDLING EMERGENCY SESSION AND RELATED COMMUNICATION DEVICE

(75) Inventor: Kundan Tiwari, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 482 days.

(21) Appl. No.: 13/190,490

(22) Filed: Jul. 26, 2011

(65) Prior Publication Data
US 2012/0021715 A1    Jan. 26, 2012

Related U.S. Application Data

(60) Provisional application No. 61/367,465, filed on Jul. 26, 2010.

(51) Int. Cl.
| | | |
|---|---|---|
| *H04M 11/04* | (2006.01) | |
| *H04W 4/22* | (2009.01) | |
| *H04W 76/00* | (2009.01) | |
| *H04W 76/06* | (2009.01) | |

(52) U.S. Cl.
CPC .............. *H04W 4/22* (2013.01); *H04W 76/007* (2013.01); *H04W 76/064* (2013.01)

(58) Field of Classification Search
CPC ... H04W 4/22; H04W 76/007; H04W 76/064; H04W 76/06
See application file for complete search history.

(56) References Cited

U.S. PATENT DOCUMENTS

| | | | |
|---|---|---|---|
| 2002/0142805 A1* | 10/2002 | Pecen ................. | H04L 63/0407 455/558 |
| 2004/0190522 A1* | 9/2004 | Aerrabotu ......... | H04L 29/12009 370/395.3 |
| 2004/0192251 A1* | 9/2004 | Zhao ................... | H04W 76/007 455/404.1 |
| 2004/0192252 A1* | 9/2004 | Aerrabotu ......... | H04M 3/42195 455/404.1 |
| 2005/0288051 A1 | 12/2005 | Van Bosch | |
| 2008/0268809 A1* | 10/2008 | Busin ..................... | H04W 4/02 455/404.2 |
| 2010/0266107 A1* | 10/2010 | Brusilovsky et al. ........... | 379/46 |
| 2010/0297979 A1* | 11/2010 | Watfa et al. ................ | 455/404.1 |
| 2011/0188411 A1* | 8/2011 | Faccin et al. .................. | 370/259 |
| 2012/0026975 A1 | 2/2012 | Wu | |

FOREIGN PATENT DOCUMENTS

CN    101730267 A    6/2010
WO    2009124131 A2   10/2009

OTHER PUBLICATIONS

European patent application No. 11006151.2, European Search Report mailing date: Oct. 24, 2011.
HTC, "Handling of the emergency PDN connection when the SIM contact is lost.", 3GPP TSG CT WG1 Meeting #68, C1-104523, Nov. 15-19, 2010, Jacksonville (FL), USA, XP050478928, p. 1.

(Continued)

*Primary Examiner* — Ajit Patel
(74) *Attorney, Agent, or Firm* — Winston Hsu; Scott Margo

(57) ABSTRACT

A method of handling emergency session for a mobile device in a wireless communication system is disclosed. The method comprises having an ongoing PS (packet switched) emergency session; not initiating a PS detach procedure when SIM (subscriber identity module) contact is lost; and keeping the ongoing PS emergency session active and not initiating an activation procedure.

16 Claims, 4 Drawing Sheets

(56) References Cited

OTHER PUBLICATIONS

3GPP TS 24.301 V9.3.0 (Jun. 2010), 3rd Generation Partnership Project; Technical Specification Group Core Network and Terminals; Non-Access-Stratum (NAS) protocol for Evolved Packet System (EPS); Stage 3 (Release 9), XP050441653, p. 1-294.

3GPP TS 24.008 V9.3.0 (Jun. 2010);3rd Generation Partnership Project; Technical Specification Group Core Network and Terminals; Mobile radio interface Layer 3 specification; Core network protocols; Stage 3 (Release 9).

Office action mailed on Sep. 2, 2013 for the China application No. 201110211139.7, filing date Jul. 26, 2011, p. 1-6.

\* cited by examiner

METHOD OF HANDLING EMERGENCY SESSION AND RELATED COMMUNICATION DEVICE

CROSS REFERENCE TO RELATED APPLICATIONS

This application claims the benefit of U.S. Provisional Application No. 61/367,465 filed on Jul. 26, 2010 and entitled "Method to handle emergency session when the SIM contact is lost from the device", the contents of which are incorporated herein.

BACKGROUND OF THE INVENTION

1. Field of the Invention

The application relates to a method and a related communication device used in a wireless communication system and related communication device, and more particularly, to a method of handling emergency session and a related communication device in a wireless communication system.

2. Description of the Prior Art

A GSM (global system for mobile communication) system, initiated by the third generation partnership project (3GPP), is now being regarded as a new radio interface and radio network architecture that provides a high data rate, low latency, packet optimization, and improved system capacity and coverage. In the GSM system, an UMTS (universal mobile telecommunication system) includes a plurality of base stations and communicates with a plurality of mobile stations (MSs), also referred as to user equipments (UEs).

A General packet radio service (GPRS) is a packet oriented mobile data service on GSM cellular communication systems. GPRS enhances the second generation (2G) phones to enable them to send and receive data more rapidly. With a GPRS connection, the phone is "always on" and can transfer data immediately, and at higher speeds: typically 32-48 kbps. An additional benefit is that data can be transferred at the same time as making a voice call. GPRS is now available on most new phones.

GPRS is part of a series of technologies that are designed to move the 2G networks closer to the performance of 3G (the third generation) networks. The key characteristic of a 3G network is its ability to transfer large amounts of data at high speed (up to 2 Mbps), enabling applications like video calling, video downloads, web browsing, email, etc. By increasing the speed of a 2G network, some of these applications become possible, e.g. web browsing and sending or receiving emails with large attachments.

A GPRS detach procedure is used in the following conditions: (1) to detach the IMSI for GPRS services only. Independent of the network operation mode, this procedure is used by all kind of GPRS MSs; (2) as a combined GPRS detach procedure used by GPRS MSs operating in MS operation mode A or B to detach the IMSI for GPRS and non-GPRS services or for non-GPRS services only, if the network operates in network operation mode I and no circuit-switched transaction is ongoing; (3) in the case of a network failure condition to indicate to the MS that a re-attach with successive activation of previously active PDP contexts shall be performed. In this case, the MS may also perform the procedures needed in order to activate any previously active multicast service(s); or (4) to detach the IMSI or IMEI for emergency bearer services.

IP multimedia subsystem (IMS) emergency calls are supported in the specification and the UE may initiate an IMS emergency call on the packet switch (PS) domain if the network supports the IMS emergency call service. An indication is provided to inform the UE that IMS emergency call services are supported. A UE will perform the GPRS detach procedure and detach itself from the network on sending DETACH REQUEST message when the SIM is removed from the device. The SIM contact to the device can be lost due to some mechanical problem e.g. loose SIM contact or user drop the phone while in a call. In this case, the UE will detach the device from the PS service even when PS emergency session e.g. IMS emergency call was active. As a result the emergency call will be dropped and it may take some time to make another emergency call after user properly put the SIM card back in the device. In some time critical case this delay is quite significant.

SUMMARY OF THE INVENTION

A method of handling emergency session in a wireless communication system is provided.

A method of handling emergency session for a mobile device in a wireless communication system is disclosed. The method comprises having an ongoing PS (packet switched) emergency session; not initiating a PS detach procedure when SIM (subscriber identity module) contact is lost; and keeping the ongoing PS emergency session active and not initiating an activation procedure.

A method of handling emergency session for a network in a wireless communication system is disclosed. The method comprises having an ongoing PS emergency session; receiving a message from a mobile device, wherein the message indicates SIM contact is lost; stopping sending downlink data for all non-emergency PDP contexts according to reception of the message; and continuing the ongoing PS emergency session.

A communication device for handling emergency session in a wireless communication system is disclosed. The communication device comprises means for having an ongoing PS emergency session; means for not initiating a PS detach procedure when SIM contact is lost; and means for keeping the ongoing PS emergency session active and not initiating an activation procedure.

A communication device for handling emergency session in a wireless communication system is disclosed. The communication device comprises means for having an ongoing PS emergency session; means for receiving a message from a mobile device, wherein the message indicates SIM contact is lost; means for stopping sending downlink data for all non-emergency PDP contexts according to reception of the message; and means for continuing the ongoing PS emergency session.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
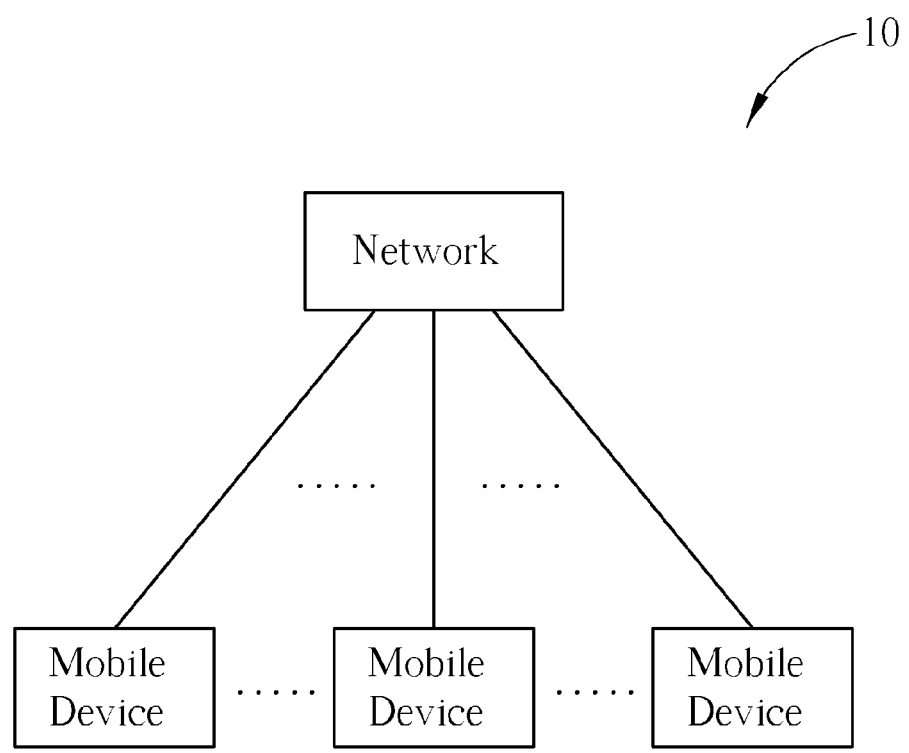
FIG. 1 is a schematic diagram of an exemplary wireless communication system.

Please refer to FIG. 1, which illustrates a schematic diagram of an exemplary wireless communication system 10.

Briefly, the wireless communication system 10 is composed of a network and a plurality of mobile devices. The wireless communication system 10 can be a GPS (General Packet Radio Service) system, or any other similar network system supporting packet switched services such as UMTS (Universal Mobile Telecommunications System), an LTE (long-term evolution), LTE-Advance system. In GPRS system, the network is referred as a Universal Terrestrial Radio Access Network (UTRAN) comprising and a plurality of NBs (Node Bs). GPRS enables data transfers through cellular networks. It is used for mobile internet, MMS and other data communications. In theory the speed limit of GPRS is 115 kbps, but in most networks it is around 35 kbps. The mobile device is referred as to a user equipment (UEs) or a mobile station (MS) supporting the abovementioned RATs and may be a device such as mobile phones, computer systems, etc. This terminology will be used throughout the application for ease of reference, however, this should not be construed as limiting the disclosure to any one particular type of network. In some examples, the network and the UE may be seen as a transmitter or receiver according to transmission direction, e.g., for uplink (UL), the UE is the transmitter and the network is the receiver, and for downlink (DL), the network is the transmitter and the UE is the receiver.

Figure 2:
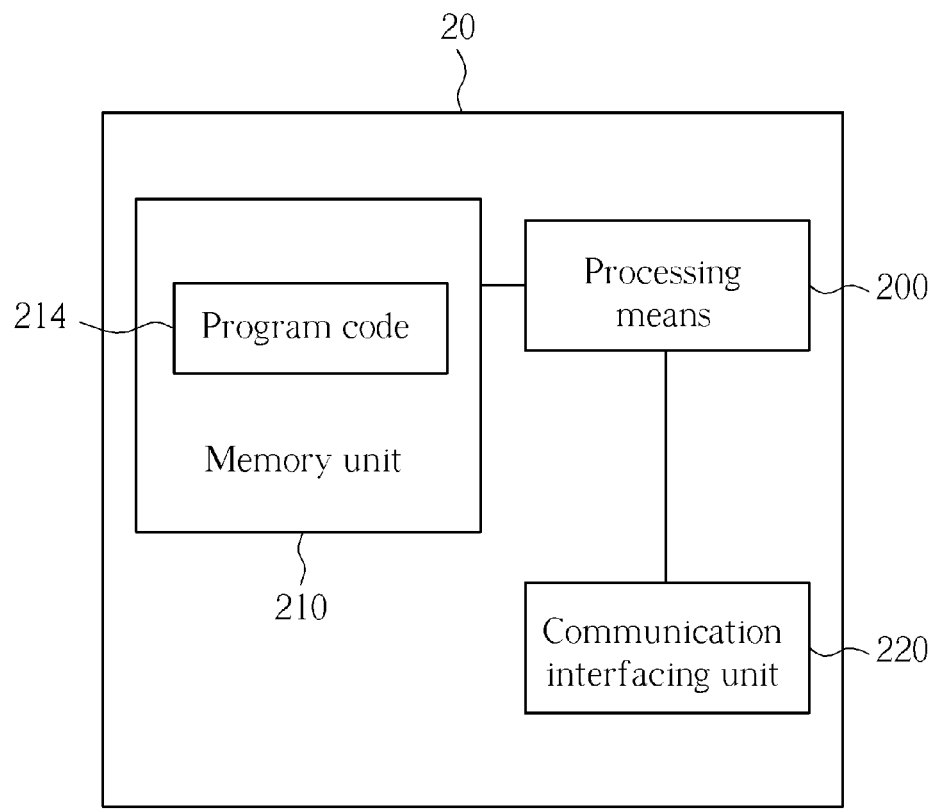
FIG. 2 is a schematic diagram of an exemplary communication device.

Please refer to FIG. 2, which illustrates a schematic diagram of an exemplary communication device 20. The communication device 20 may be the mobile devices or the network shown in FIG. 1 and may include a processor 200 such as a microprocessor or ASIC, a memory unit 210 and a communication interfacing unit 220. The memory unit 210 may be any data storage device that can store program code 214 for access by the processor 200. Examples of the memory unit 210 include but are not limited to a subscriber identity module (SIM), read-only memory (ROM), random-access memory (RAM), CD-ROMs and optical data storage devices. The communication interfacing unit 220 may be preferably a radio transceiver and accordingly exchanges wireless signals according to processing results of the processor 200.

A GPRS detach procedure shall be invoked by a UE if the UE is switched off, the SIM/USIM (subscriber identity module/Universal Subscriber Identity Module) card is removed from the UE or if the GPRS or non-GPRS capability of the UE is disabled. The procedure may be invoked by a network to detach an IMSI (International Mobile Subscriber Identity) for GPRS services. The GPRS detach procedure causes the UE to be marked as inactive in the network for GPRS services, non-GPRS services or both services. The loose SIM contact may be caused by some mechanical problems. For example, a user drops the phone while in a call.

Figure 3:
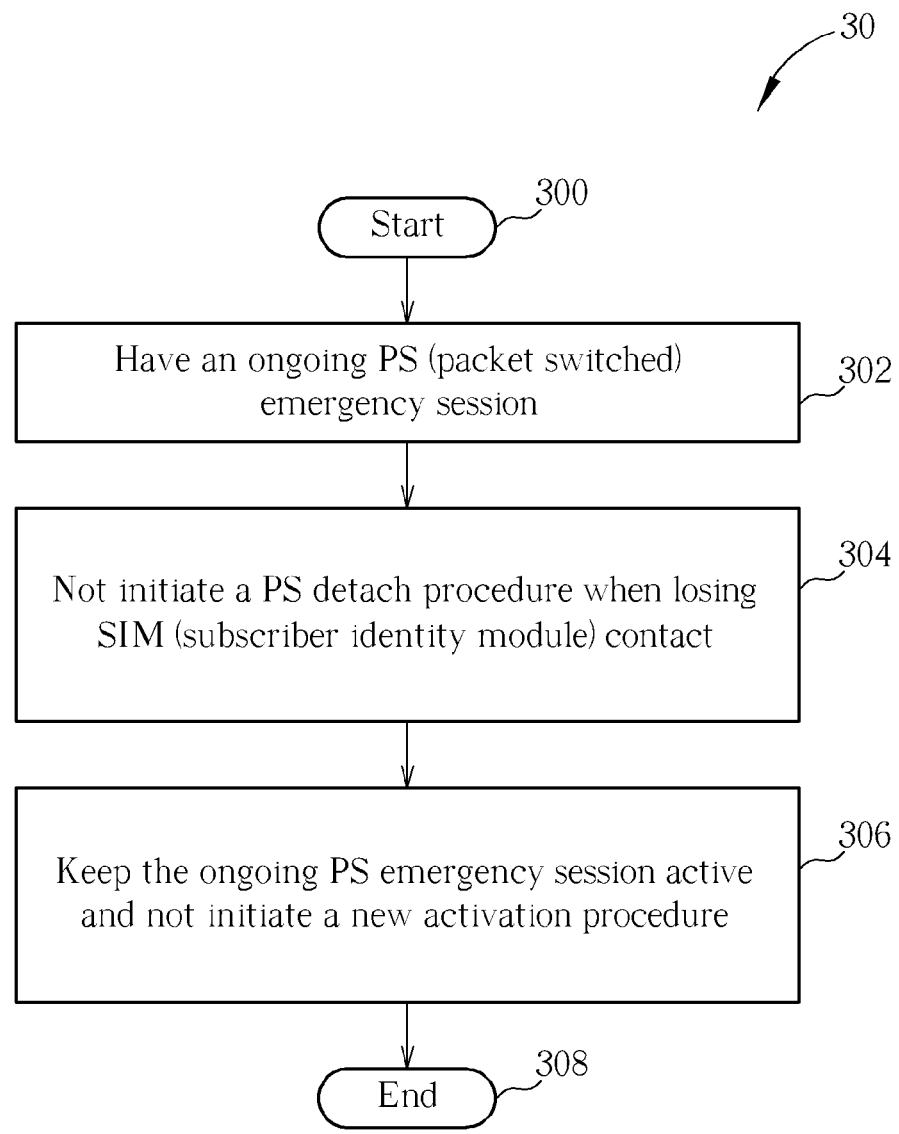
FIG. 3 is a flow chart of an exemplary process.

Please refer to FIG. 3, which is a flowchart of an exemplary process 30. The process 30 is utilized for handling emergency session for a UE in a wireless communication system. The wireless communication system could be referred as to the wireless communication system 10 and can be compiled into the program code 214. The process 30 includes the following steps:

Step 300: Start.

Step 302: Have an ongoing PS (packet switched) emergency session.

Step 304: Not initiate a PS detach procedure when losing SIM (subscriber identity module) contact.

Step 306: Keep the ongoing PS emergency session active and not initiate a new activation procedure.

Step 308: End.

According to the process 30, the UE has the ongoing PS emergency session (e.g. IMS emergency call). The UE does not initiate the PS detach procedure when the UE loses the SIM contact. Preferably, the PS detach procedure is a GPRS detach procedure. Instead of initiating a new activation procedure, the UE keeps the ongoing PS emergency. In other words, the UE keeps the original ongoing IMS emergency call rather than initiate the GPRS detach procedure when the SIM contact is lost during the ongoing IMS emergency call. As a result, the IMS emergency call can keep active without being dropped.

Further, the UE should stop sending uplink data for all PDP (Packet data protocol) contexts not used for the ongoing emergency session, namely non-emergency PDP contexts. The PDP context offers a packet data connection over which the UE and the network can exchange IP packets. Usage of these packet data connections is restricted to specific services. These services can be accessed via so-called access points. The context defines aspects such as Routing, QoS (Quality of Service), Security, Billing etc.

In addition, the UE sends a GMM (GPRS Mobile Management) message or SM message to a network to inform the network that the SIM contact is lost. For example, a GMM STATUS message may include a cause "SIM remove" or a DETACH REQUEST message may indicates a detach type "SIM remove". The UE may send the DETACH REQUEST message with cause value indicating SIM remove or DEACTIVATE PDP CONTEXT REQUEST to the network. In some examples, the UE and network deactivates non-emergency PDP context locally, which means no peer-to-peer signaling gets involved.

If there exists security context current of the ongoing PS emergency session used by the UE, the UE should keep the security context and continues to use it for the ongoing PS emergency session and related signaling.

Figure 4:
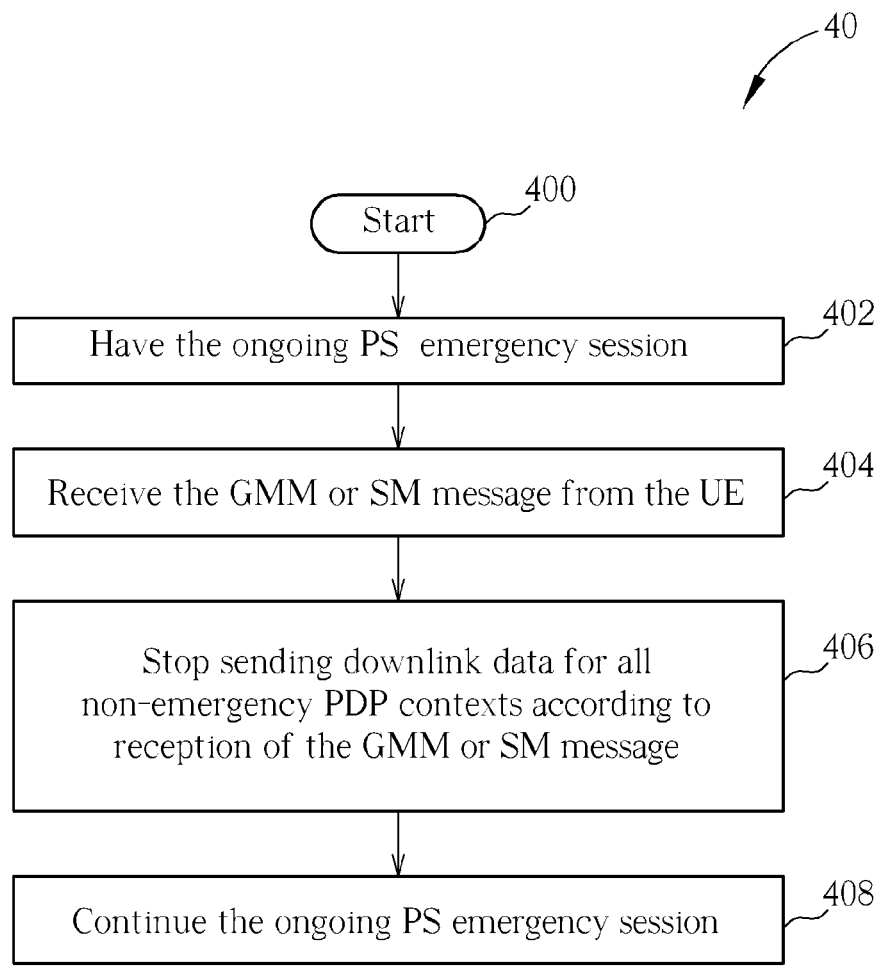
FIG. 4 is a flow chart of an exemplary process.

Upon the reception of the GMM or SM message, the network may take corresponding actions. Please refer to FIG. 4, which is a flowchart of an exemplary process 40. The process 40 is utilized for handling emergency session for the network in the wireless communication system and can be compiled into the program code 214.

The process 40 includes the following steps:

Step 400: Start.

Step 402: Have the ongoing PS emergency session.

Step 404: Receive the GMM or SM message from the UE.

Step 406: Stop sending downlink data for all non-emergency PDP contexts according to reception of the GMM or SM message.

Step 408: Continue the ongoing PS emergency session.

According to the process 40, the network receives the GMM or SM message from the UE when having the ongoing PS emergency session (e.g. IMS emergency call). The network stops sending the downlink data for all the non-emergency PDP contexts when receiving the GMM or SM message. The network continues the ongoing PS emergency session without detaching the UE. As a result, the IMS emergency call can keep active without being dropped. Please note that the aforementioned steps can be performed locally by the network without peer-to-peer signaling.

In addition, the network deactivates all the non-emergency PDP contexts by initiating a PDP context deactivation procedure. The PDP context deactivation procedure is used to delete a particular logical connection between the UE and the network (e.g. Gateway GPRS Support Node, GGSN). If any security context has been used for the ongoing PS emergency session, the network continues with the security context. Or, the network may configure null integrity protection algorithm, null ciphering algorithm by initiating a security mode control procedure. The security mode control procedure is used by the network to control either the ciphering or the integrity protection process. For the ciphering, the security mode control procedure can either start the ciphering or change the ciphering key.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processing means 200 processes the program code 214 related to the abovementioned processes and the processed results can handling emergency session in the wireless communications system 10.

To sum, when the UE has an ongoing PS emergency session, the SIM contact may be lost. In this situation, the UE does not initiate the GPRS detach procedure and keep the ongoing emergency session active. Accordingly, the network may receive the GMM or SM message indicating the SIM contact is lost. The network stops sending the downlink data for all the non-emergency PDP contexts and deactivates all the non-emergency PDP contexts. Consequently, the ongoing PS emergency session can be preserved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling emergency session for a mobile device in a wireless communication system, the method comprising:
   the mobile device having an ongoing packet switched (PS) emergency session with a network;
   after proceeding the ongoing PS emergency session, the mobile device not initiating a PS detach procedure when subscriber identity module (SIM) contact is lost;
   sending a General Packet Radio Service (GPRS) Mobile Management (GMM) message or a Session Management (SM) message from the mobile device to the network for indicating the SIM contact being lost; and
   the mobile device keeping the ongoing PS emergency session active without initiating a Packet Data Protocol (PDP) context activation procedure.

2. The method of claim 1 further comprising sending a message to the network to inform the network that the SIM contact is lost.

3. The method of claim 1 further comprising keeping security context of the ongoing PS emergency session.

4. The method of claim 1 further comprising stopping sending uplink data for all non-emergency PDP contexts and deactivating all the non-emergency PDP contexts.

5. A method of handling emergency session for a network in a wireless communication system, the method comprising:
   the network having an ongoing packet switched (PS) emergency session with a mobile device;
   after proceeding the ongoing PS emergency session, the network receiving a message from the mobile device, wherein the message indicates subscriber identity module (SIM) contact is lost, and the message is a General Packet Radio Service (GPRS) Mobile Management (GMM) message or a Session Management (SM) message;
   the network stops sending downlink data for all non-emergency Packet Data Protocol (PDP) contexts according to reception of the message; and
   the network continuing the ongoing PS emergency session.

6. The method of claim 5 further comprising: deactivating all the non-emergency PDP contexts.

7. The method of claim 6, wherein the step of deactivating all the non-emergency PDP contexts comprises initiating a PDP context deactivation procedure.

8. The method of claim 5 further comprising continuing security context of the ongoing PS emergency session.

9. A communication device for handling emergency session in a wireless communication system, the communication device comprising:
   a processing unit; and
   a storage device, storing a program code executed by the processing unit, for processing a method of handling emergency session, the method comprising:
      the communication device having an ongoing packet switched (PS) emergency session with a network;
      after proceeding the ongoing PS emergency session, the communication device not initiating a PS detach procedure when subscriber identity module (SIM) contact is lost;
      sending a General Packet Radio Service (GPRS) Mobile Management (GMM) message or a Session Management (SM) message from the communication device to the network for indicating the SIM contact being lost; and
      the communication device keeping the ongoing PS emergency session active without initiating a Packet Data Protocol (PDP) context activation procedure.

10. The communication device of claim 9, wherein the method further comprises sending a message to the network to inform the network that the SIM contact is lost.

11. The communication device of claim 9, wherein the method further comprises keeping security context of the ongoing PS emergency session.

12. The communication device of claim 9, wherein the method further comprises stopping sending uplink data for all non-emergency PDP contexts and deactivating all the non-emergency PDP contexts locally.

13. A communication device for handling emergency session in a wireless communication system, the communication device comprising:
   a processing unit; and
   a storage device, storing a program code executed by the processing unit, for processing a method of handling emergency session, the method comprising:
      the communication device having an ongoing packet switched (PS) emergency session with a mobile device;
      after proceeding the ongoing PS emergency session, the communication device receiving a message from the mobile device, wherein the message indicates subscriber identity module (SIM) contact is lost, and the message is a General Packet Radio Service (GPRS) Mobile Management (GMM) message or a Session Management (SM) message;
      the communication device stops sending downlink data for all non-emergency PDP contexts according to reception of the message; and
      the communication device continuing the ongoing PS emergency session.

14. The communication device of claim 13, wherein the method further comprises deactivating all the non-emergency PDP contexts.

15. The communication device of claim 14, wherein the step of deactivating all the non-emergency PDP contexts comprises initiating a PDP context deactivation procedure.

16. The communication device of claim 13, wherein the method further comprises continuing security context of the ongoing PS emergency session.

* * * * *